United States Patent [19]

Harker et al.

[11] Patent Number: 4,569,638
[45] Date of Patent: Feb. 11, 1986

[54] PUMP WITH RESILIENTLY MOUNTED IMPELLER

[75] Inventors: John H. Harker, Riverwoods; Thomas E. Boesen, Morton Grove, both of Ill.

[73] Assignee: International Telephone and Telegraph Corporation, New York, N.Y.

[21] Appl. No.: 445,676

[22] Filed: Nov. 30, 1982

[51] Int. Cl.[4] .................. F04B 17/00; F04D 29/20
[52] U.S. Cl. ................... 417/365; 417/423 R; 310/191; 403/372; 416/135
[58] Field of Search ........ 416/135 R; 403/355, 403/365, 372; 310/191, 210; 417/365, 423 R; 277/80

[56] References Cited

U.S. PATENT DOCUMENTS

| | | | |
|---|---|---|---|
| 1,832,614 | 11/1931 | Beckfield | 418/90 |
| 1,880,911 | 10/1932 | Durdin | 415/174 |
| 2,231,690 | 2/1941 | Sheldrick et al. | 415/174 |
| 3,333,544 | 8/1967 | Turk | 417/423 R |
| 3,407,882 | 10/1968 | Wooden et al. | 403/372 |
| 3,836,291 | 9/1974 | Bottcher et al. | 417/423 R |

FOREIGN PATENT DOCUMENTS

| | | | |
|---|---|---|---|
| 966616 | 10/1950 | France | 416/135 |
| 2425541 | 1/1980 | France | 416/135 R |

Primary Examiner—Carlton R. Croyle
Assistant Examiner—Theodore W. Olds
Attorney, Agent, or Firm—Donald J. Lenkszus

[57] ABSTRACT

A motor pump is described wherein an air cooled, oil-lubricated motor has its rotor axially displaced from its stator and in which the bearing support for the motor shaft is entirely on one side of the rotor. The drive shaft is coupled to the impeller in the pump unit by means of a flexible coupler which serves to reduce vibration levels which are transmitted through the piping system.

12 Claims, 12 Drawing Figures

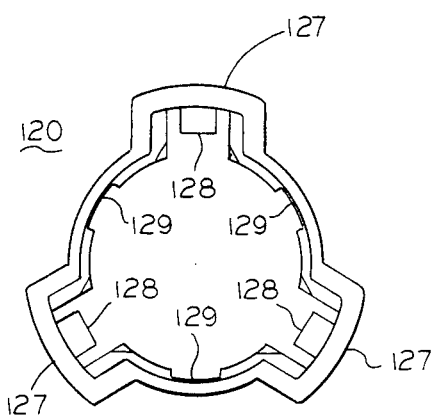
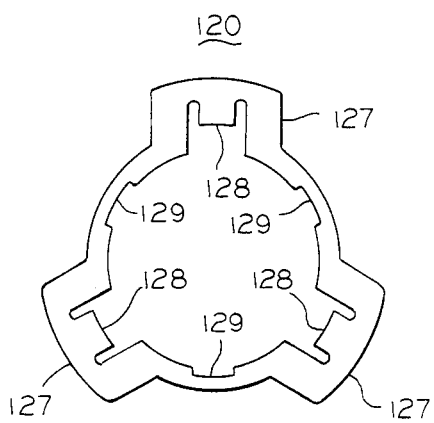
FIG.5  FIG.6  FIG.7
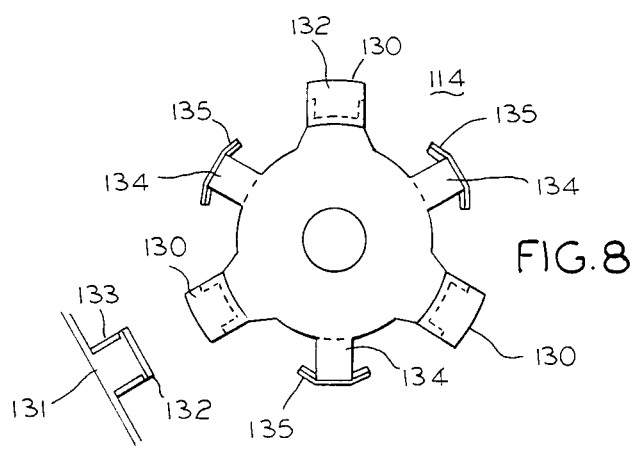
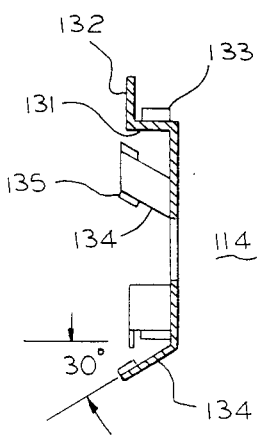
FIG.8
FIG.9
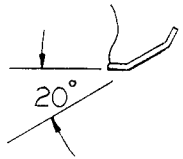
FIG.11
FIG.10
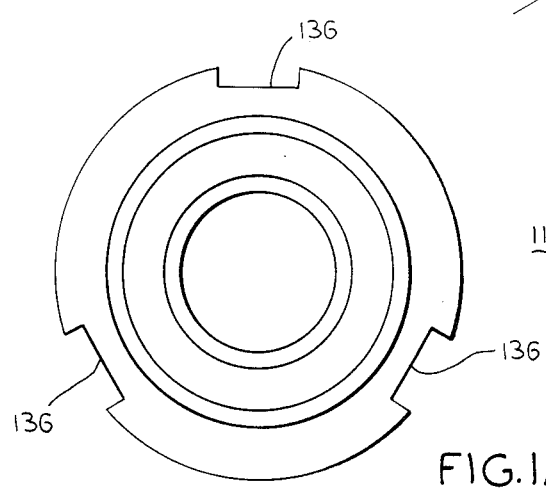
FIG.12

4,569,638

PUMP WITH RESILIENTLY MOUNTED IMPELLER

BACKGROUND OF THE INVENTION

This invention pertains to motor pumps.

Motor pump units of the type to which the present invention is directed are used particularly in central heating installations for boosting water circulation.

One problem with such motor pump units is that when they are installed, unacceptable noise levels may occur as a result of high vibration levels in the pump being transmitted into the living environment through the piping system.

SUMMARY OF THE INVENTION

In accordance with the principles of the invention, a flexible coupling is provided between the motor shaft and the impeller. More specifically, the impeller is positioned concentric to the motor shaft and an impeller isolator, comprising a flexible material also positioned concentric to the motor shaft, is coupled to the shaft and to the impeller. Thus, in accordance with the invention, the shaft carries the impeller isolator which in turn carries the impeller.

Further in accordance with one aspect of the invention, the impeller isolator comprises a ring having a plurality of radially outward extending tabs, each of the outward extending tabs further having a radially inward extending finger. The impeller includes a cavity having an outer periphery in the shape of the impeller isolator. A cage adapted to be clamped to the motor shaft includes a first plurality or radially outward extending fingers, each terminating in a portion adapted to engage one of the radially inward extending fingers of the impeller isolator. The cage further includes a second plurality of radially outward extending fingers each terminating in a flange adapted to engage a corresponding notch on the inner circumferential wall of the impeller isolater.

Further in accordance with the principles of the invention, an oil lubricated motor utilizes what may be called an "overhung" rotor, i.e., the rotor shaft is supported on only one side of the rotor.

Still further in accordance with the principles of the invention, the rotor is slightly offset from the stator in the direction of the pump. By having this offset, the magnetic forces between the rotor and stator will exert an axially directed force on the rotor in a direction opposite the pump. This force aids in pulling a seal face, which is carried with the impeller, against a ceramic seat to achieve better sealing between the motor and the pump. Additionally, a thrust spring is positioned to exert a force on the shaft to help seat the seal face. A seal spring is also provided to urge the seal face against the ceramic seat.

BRIEF DESCRIPTION OF THE DRAWINGS

The invention wil be better understood from a reading of the following description of a preferred embodiment in conjunction with the drawings in which like reference numerals designate like elements and in which:

FIG. 5 illustrates the impeller cushion of FIG. 1 from the motor side;

FIG. 6 illustrates the impeller cushion in a side cross-sectional view;

FIG. 7 illustrates the impeller cushion from the impeller side;

FIGS. 8, 9, 10 and 11 illustrate the impeller cushion cage of FIG. 1; and

FIG. 12 illustrates the seal face of FIG. 1 from the motor side.

DETAILED DESCRIPTION

Figure 1:
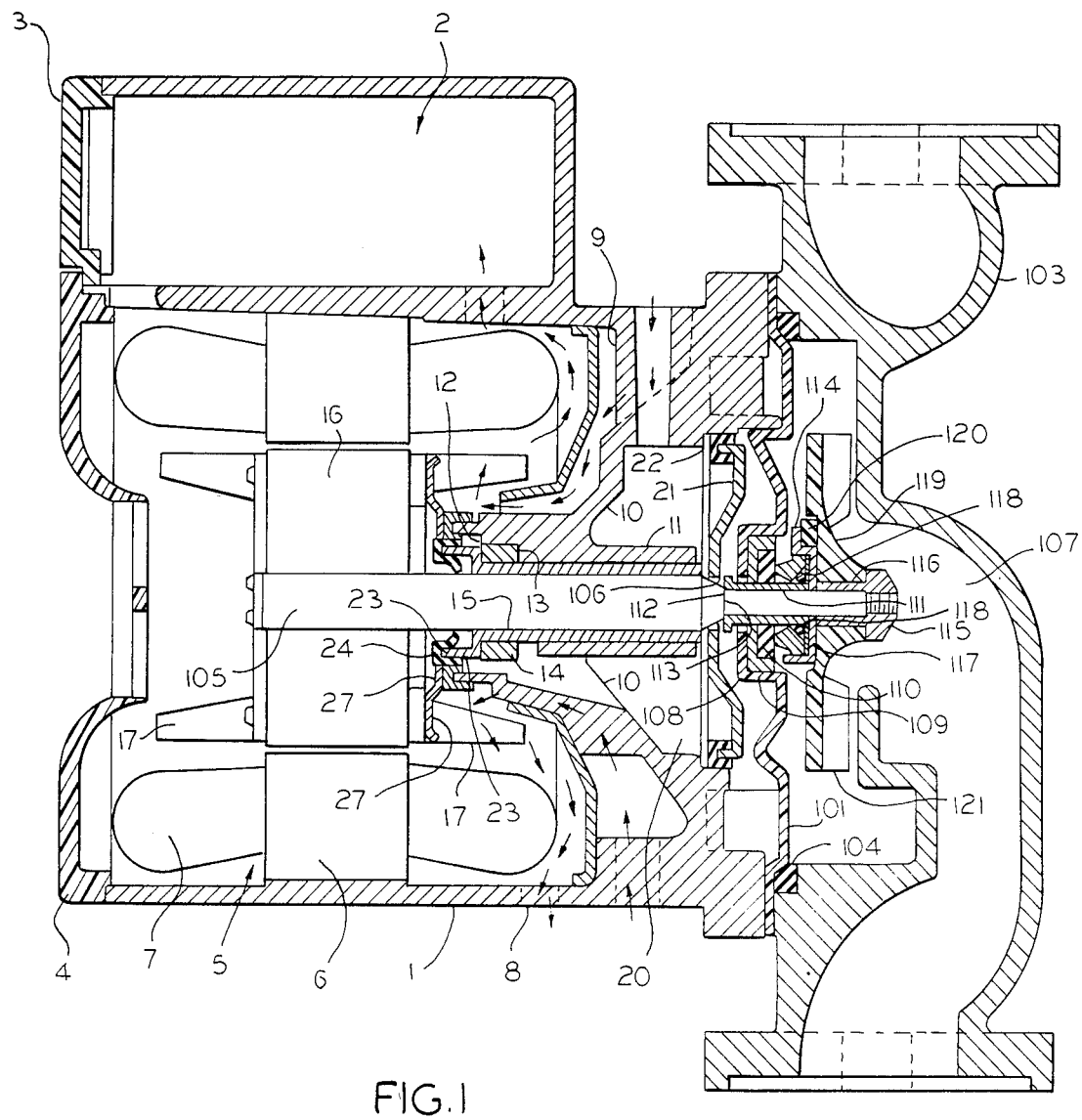
FIG. 1 illustrates in cross-section a motor-pump unit in accordance with the invention.

The motor includes a housing 1 having an integrally formed conduit box and capacitor housing 2. End plates 3 and 4 are provided at one end of the motor. A stator 5 comprising stator laminations 6 and field windings 7 is disposed within an outer cylindrical wall portion 8. A diametrically or transverse inwardly extending integral wall portion 9 is provided with an axially disposed integral scroll 10 from which an axially extending integral tubular wall 11 is formed. The tubular wall 11 is positioned concentric with the longitudinal axis of cylindrical wall portion 8 and extends axially inward and outward with respect to wall portion 9. Axially spaced from the inward extending end of the tubular wall is a first step 12 and a second step 13. Step 13 is adapted to receive a bearing ring 14. A tubular bearing 15 is carried within the tubular wall 11. A motor shaft 105 is supported in the bearing 15. The motor shaft 105 includes a rearward axially extending portion which carries a rotor 16. Axially extending cooling fins 17 are provided on the rotor 16. The fins 17 circulate air through the motor as shown by the arrows thereby providing air cooling of the motor.

It should be noted that the rotor 16 is axially displaced relative to the stator 6 by a slight amount. The reason for this offset is described in greater detail below.

An oil reservoir is provided by the chamber 20 which is closed off by a wick closure plate 21 and seal ring 22. A wick which is not shown is provided extending from the bottom of chamber 20 up to and beyond the motor shaft 105.

At the rotor end of tubular wall 11 is provided a thrust ring 23, a thrust gasket 24 and a thrust spring 27. Additionally, an oil retainer ring 25 is carried on the end of tubular wall 11. Lubrication is provided by oil in the reservoir 20 being drawn by the wick which is not shown to the shaft 105. The oil is drawn between the bearing 15 and shaft 105 to the thrust ring 23 from which it drips back into the reservoir 20.

A cover plate 101 is interposed between the motor housing 1 and the pump housing 103. A seal ring 104 is placed between the seal plate and the pump housing 103. The motor shaft 105 extends through an aperture 106 in the cover plate 101 into the pump chamber 107.

The cover plate 101 includes a cup shaped depression 108 concentric with the aperture 106. A rubber cup 109 carries a ceramic seat 110 and is retained in the cup shaped depression 108. A copper sleeve 111 is carried on the shaft 105 and has a flange 112 which is adapted to abut a shoulder 113 on the shaft 105. A cage member 114 is positioned at the right end of the sleeve 111 as shown. A nut 115 having an integrally formed sleeve 116 is slipped over the end of the shaft 105 and tightened on the shaft so that the cage 114 is captured between the nut 115 and its copper sleeve 111. A carbon seal face 117 is carried on the shaft 105 between the cage 114 and the ceramic seat 110. The seal face carries an "O"-ring seal 118. Additionally, a seal spring 118a is provided between the seal face 117 and the cage 114. It should be noted that the copper shaft sleeve 111 is provided to protect the shaft 105 from corrosion.

An impeller 119 is disposed on the shaft 105 between the nut 115 and the cage 114. The impeller 119 is coupled to the shaft 105 via impeller cushion 120 and cage 114.

Figure 2:
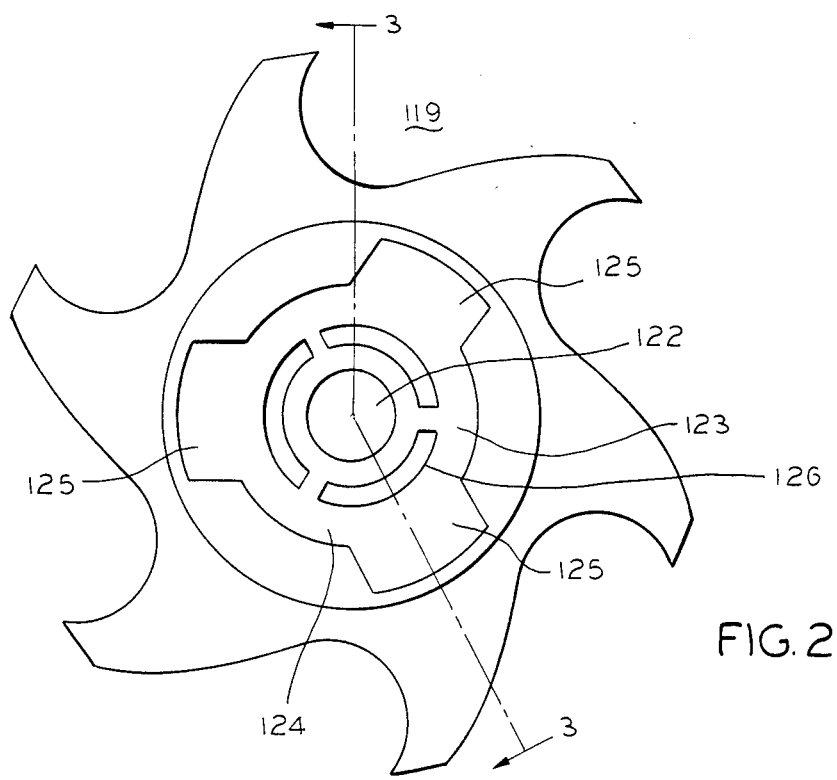
FIG. 2 illustrates the impeller of FIG. 1 as viewed from the motor.
Figures 3, 4:
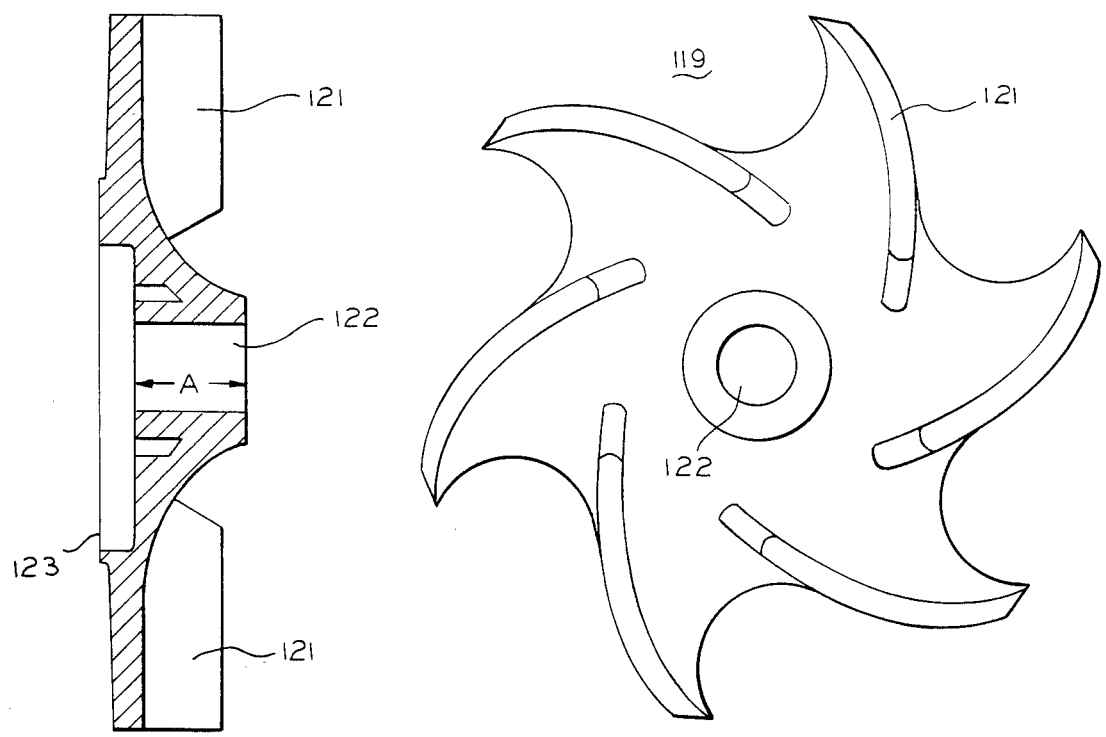
FIG. 3 illustrates the impeller of FIG. 2 in cross-section taken along lines 3—3.
FIG. 4 illustrates the impeller as viewed from the right side of FIG. 1.

The impeller 119 is shown in greater detail in FIGS. 2, 3 and 4. The impeller is integrally formed of plastic and has six blades 121 which are equally spaced apart. Concentric to a central aperture 122 is a recess 123. The recess includes a generally circular portion 124 having three equally spaced apart radially outward extending portions 125. Three slots 126 and several apertures are provided for weight reduction. The recess 123 is adapted to receive the impeller cushion 120 of FIG. 1 which is shown in greater detail in FIGS. 5, 6, and 7.

The impeller cushion 120 is formed of rubber of a type suitable for use in water at 225 degrees F. and is in the shape of a ring having three equally spaced apart radially outward extending finger portions 127. Each portion 127 includes a radially inward projecting tab 128. Equally spaced between each adjacent pair of the portions 127, there is a notch 129 on the inner circumferential surface of the ring.

The cage 114 shown in detail in FIGS. 8-11 is formed of brass sheet and includes six radially extending arms. Three of the arms 130 are each adapted to engage a corresponding one of the finger portions 127 and its tab 128.

Specifically each arm 130 includes a portion 131 extending at a right angle to the body of the cage and a second portion 132 extending at a right angle to portion 131. The portion 131 carries a pair of radially outward extending wings 133. Each arm 130 is adapted to engage one of the finger portions 127 and its tab 128 of the impeller cushion 120 of FIGS. 5-7. The other three arms 134 of the cage 114 are disposed between the arms 130. Each arm 134 extends radially outward from the cage at an angle of 30 degrees thereto and terminates in two inwardly bent tabs 135. The arms 134 are adapted to engage the notches 129 of the impeller cushion 120 and urge the cushion 120 against the sidewalls of the recess 123 of the impeller. Additionally, the arms 134 engage notches 136 on the seal face 117 which is shown in end view in FIG. 12. When assembled, the tabs 135 serve to retain the seal face 117 in position. Turning back to FIG. 1, the nut 115, as described above, includes an integrally formed sleeve 116. It should be noted that the length of the sleeve is greater than the length A of the impeller hub shown in FIG. 3. Thus, the impeller is coupled to the drive shaft 105 only via the impeller cushion 120 and the cage 114. In other words, the impeller floats free relative to the drive shaft and is driven by the rubber cushion or collar.

In operation, the magnetic forces generated by exciting the stator winding exert a force on the rotor in an axial direction such that the rotor is pulled in a direction of being centered in the magnetic field. Since the rotor is displaced from being centered with the stator, the effect of the magnetic force is such that the carbon seal face 117 carried by shaft 105 is pulled against the ceramic seat 110.

An additional force tending to pull the carbon seal face 117 into sealing engagement with the ceramic seat 110 is provided by the thrust spring 27 which is positioned such that it provides an axial force on the shaft 105 in a direction away from the pump.

Still a further axially directed force which assists in seating the seal face is provided by the hydraulic forces exerted on the impeller.

Yet a further axially directed force is provided by the seal spring 118a which urges the seal face 117 against the ceramic seat 110.

By utilizing an impeller cushion or collar consisting of relatively hard rubber in combination with a relatively light impeller, the natural frequencies of vibration of the pump are greatly reduced. More specifically the principle mode of vibration is essentially eliminated so that sounds generated by the pump are significantly reduced.

For example, in a 1/20 horsepower pump in which an impeller cushion is not provided, a vibration analysis reveals that the structural response of the motor exhibits a resonant vibration at approximately 1100 Hz. By utilizing a light impeller (9 gm) with an 80 Durometer isolator, the vibration levels were significantly reduced such that the levels were no longer objectionable.

What is claimed is:

1. A motor pump comprising:
a pump housing;
a motor housing attached to said pump housing and comprising an outer cylindrical wall, a transverse wall extending radially inward from said cylindrical wall, a transverse wall extending radially inward from said cylindrical wall, a tubular wall supported by said transverse wall, said tubular wall being positioned concentric to the longitudinal axis of said outer cylindrical wall;
a stator positioned within said motor housing;
a motor shaft having a first unsupported end portion extending from said motor housing into said pump housing, a second unsupported end portion extending in said motor housing and an intermediate portion rotatably supported within said tubular wall;
a rotor carried on said second unsupported end portion;
an impeller disposed within said pump housing, said impeller having a central bore through which said second end portion extends, and
means for coupling said impeller and said shaft, said means comprising:
a resilient ring having a plurality of radially extending tabs, said impeller having a plurality of radially extending depressions in one surface of said impeller each adapted to receive one of said tabs, and a metallic ring member coupled to said shaft first end portion and rotatable therewith and having a first plurality of radially extending arms, each of said first plurality of arms being adapted to engage a portion of said resilient ring, said resilient ring being thereby captured between and coupling said metallic ring member and said impeller such that rotary motion of said shaft and metallic ring is transferred to said impeller via said resilient ring.

2. A motor pump in accordance with claim 1, wherein said tabs extend radially outward from said resilient ring and said first plurality of arms each engage a portion of one of said tabs.

3. A motor pump in accordance with claim 2, wherein said portion of each of said tabs comprises a radially inward extending finger.

4. A motor pump in accordance with claim 1 comprising a cover plate positioned between said pump housing and said motor housing and having a central aperture, said motor shaft extending through said central aperture;

a seal seat carried on said cover plate, and a seal face adapted to engage said seal seat;

said seal face being carried by said metallic ring.

5. A motor pump in accordance with claim 4, wherein said metallic ring comprises a second plurality of radially extending arms, said second plurality of arms being adapted to engage said seal face.

6. A motor pump in accordance with claim 5, wherein said seal face comprises a plurality of grooves, each of said grooves being adapted to engage one of said second plurality of arms.

7. A motor pump in accordance with claim 1, wherein said rotor is axially displaced relative to said stator.

8. A motor pump in accordance with claim 7, comprising a stationary circular seal seat positioned concentric to said shaft and a circular seal face within said pump housing and adapted to engage said seal seat.

9. A motor pump in accordance with claim 8, wherein said rotor is subject to magnetic forces when said stator is energized such that said rotor is urged in an axial direction to urge said seal face into engagement against said seal seat.

10. A motor pump in accordance with claim 9 comprising a thrust spring coupled to said motor shaft and generating axial forces thereon to urge said seal face into engagement against said seal seat.

11. A motor pump in accordance with claim 10, comprising a seal spring directly acting on said seal face to urge said seal face into engagement against said seal seat.

12. A motor pump in accordance with claim 1, comprising a bearing tube within said tubular wall for providing a bearing support for said intermediate portion.

* * * * *